United States Patent
Marchio et al.

(10) Patent No.: US 8,889,283 B2
(45) Date of Patent: Nov. 18, 2014

(54) FLEXIBLE BATTERY MODULE FOR PRISMATIC CELLS

(75) Inventors: Michael A. Marchio, Clarkston, MI (US); Frank A. Valdez, Clarkston, MI (US); Marke S. Cicero, Ortonville, MI (US); Nick Karditsas, Lake Orion, MI (US)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 13/344,713

(22) Filed: Jan. 6, 2012

(65) Prior Publication Data
US 2012/0177970 A1      Jul. 12, 2012

Related U.S. Application Data

(60) Provisional application No. 61/431,132, filed on Jan. 10, 2011.

(51) Int. Cl.
| | |
|---|---|
| *H01M 10/50* | (2006.01) |
| *H01M 2/10* | (2006.01) |
| *H01M 10/6555* | (2014.01) |
| *H01M 10/6557* | (2014.01) |
| *H01M 2/02* | (2006.01) |
| *H01M 10/647* | (2014.01) |

(52) U.S. Cl.
CPC ........ *H01M 2/0237* (2013.01); *H01M 10/5055* (2013.01); *H01M 10/5059* (2013.01); *Y02E 60/12* (2013.01); *H01M 10/5032* (2013.01)
USPC ............ 429/120; 429/99; 429/100; 429/156; 429/159

(58) Field of Classification Search
USPC .................... 429/99, 100, 120, 156, 158, 159
See application file for complete search history.

(56) References Cited

U.S. PATENT DOCUMENTS

| | | | |
|---|---|---|---|
| 3,988,170 A | 10/1976 | Koch et al. | |
| 6,451,475 B1 * | 9/2002 | Sherwood | 429/100 |

(Continued)

FOREIGN PATENT DOCUMENTS

| | | |
|---|---|---|
| EP | 1091438 | 4/2001 |
| JP | 2003234093 A * | 8/2003 |

(Continued)

OTHER PUBLICATIONS

Taniguchi et al: "Development of nickel/metal-hydride batters for EVs and HEVs"; Journal of Power Sources, Elsevier SA, CH, vol. 100 No. 1-2; Nov. 30, 2001; pp. 117-124.

(Continued)

*Primary Examiner* — Gregg Cantelmo
(74) *Attorney, Agent, or Firm* — Maginot Moore & Beck LLP

(57) ABSTRACT

A modular frame for a battery module includes: a floor that includes an electrically non-conductive material; end walls that are perpendicular to the floor and that include the electrically non-conductive material; and side walls that are perpendicular to the floor, that are perpendicular to the end walls, and that include the electrically non-conductive material. The modular frame further includes interior walls that include the electrically non-conductive material and that define: a first row of cell slots configured to receive a first plurality of prismatic cells; a second row of cell slots configured to receive a second plurality of prismatic cells; and a chamber disposed between the first and second rows of cell slots. The modular frame further includes a first and second apertures to the chamber. The first aperture is defined by the interior walls and the side walls. The second aperture is formed through one of the end walls.

20 Claims, 15 Drawing Sheets

(56) References Cited

U.S. PATENT DOCUMENTS

| | | | |
|---|---|---|---|
| 6,517,966 B1* | 2/2003 | Marukawa et al. | 429/120 |
| 2002/0012833 A1* | 1/2002 | Gow et al. | 429/120 |
| 2002/0098412 A1 | 7/2002 | Rodriguez et al. | 429/149 |
| 2003/0017384 A1* | 1/2003 | Marukawa et al. | 429/120 |
| 2003/0039881 A1 | 2/2003 | Mount | |
| 2006/0289224 A1 | 12/2006 | Ono et al. | |
| 2007/0141459 A1 | 6/2007 | Goto et al. | |
| 2008/0026284 A1 | 1/2008 | Fujii | |
| 2008/0292948 A1* | 11/2008 | Kumar et al. | 429/120 |
| 2009/0191452 A1 | 7/2009 | Anantharaman et al. | |
| 2010/0000816 A1 | 1/2010 | Okada | 180/68.5 |
| 2010/0266885 A1 | 10/2010 | Lee | 429/120 |
| 2010/0297486 A1* | 11/2010 | Fujii | 429/120 |

FOREIGN PATENT DOCUMENTS

| | | | |
|---|---|---|---|
| JP | 2010262870 A | * | 11/2010 |
| WO | WO 2010/136861 | | 12/2010 |

OTHER PUBLICATIONS

Written Opinion of the International Searching Authority, for International Application No. PCT/US2012/020489, mailed Jul. 6, 2012.
Notification of Transmittal of the International Search Report and the Written Opinion of the International Searching Authority, or the Declaration, for International Application No. PCT/US2012/020491, mailed May 3, 2012.
Written Opinion of the International Searching Authority, for International Application No. PCT/US2012/020491, mailed May 3, 2012.

* cited by examiner

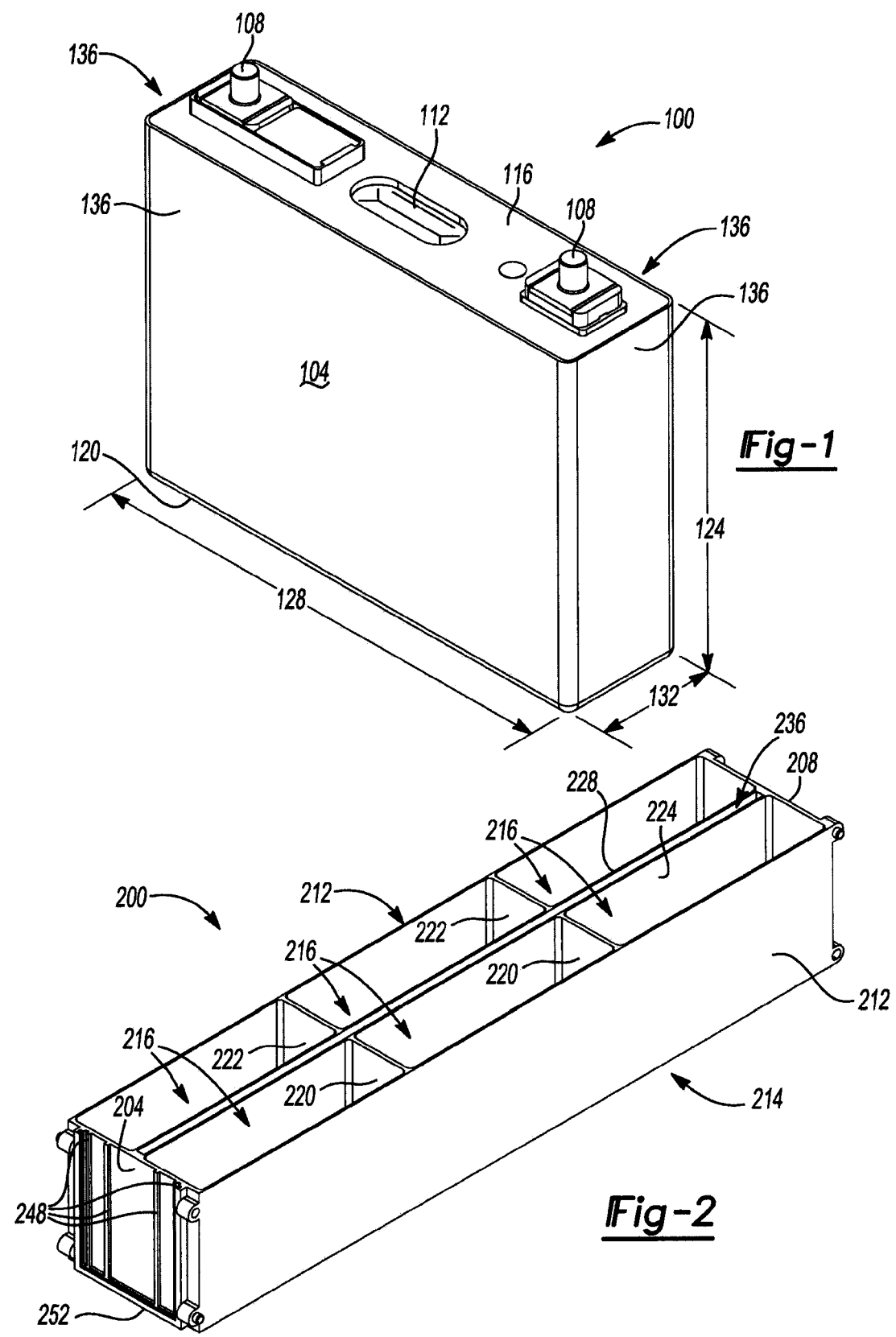

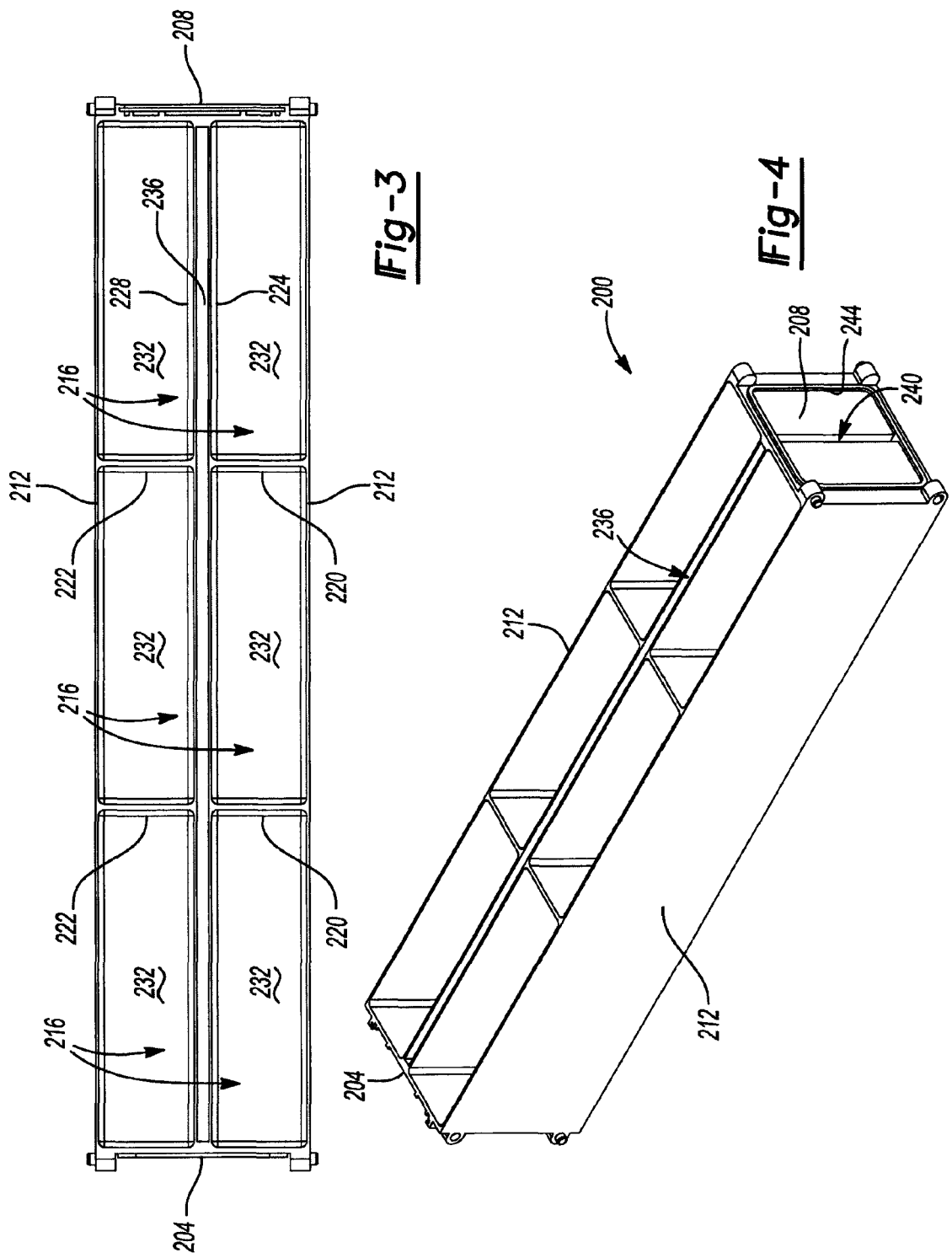

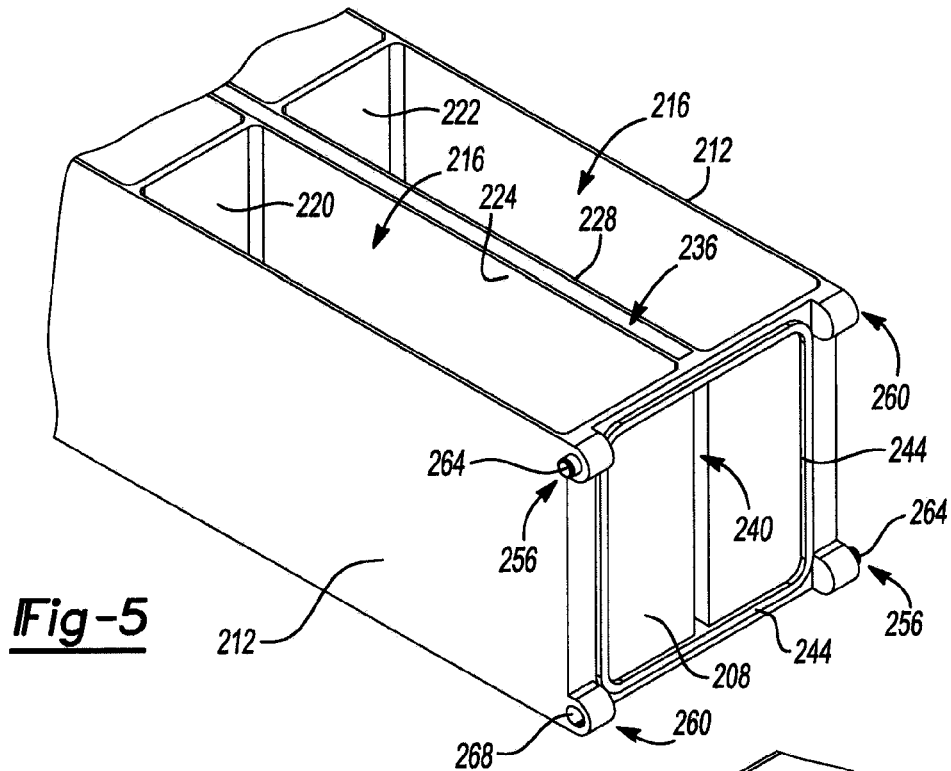
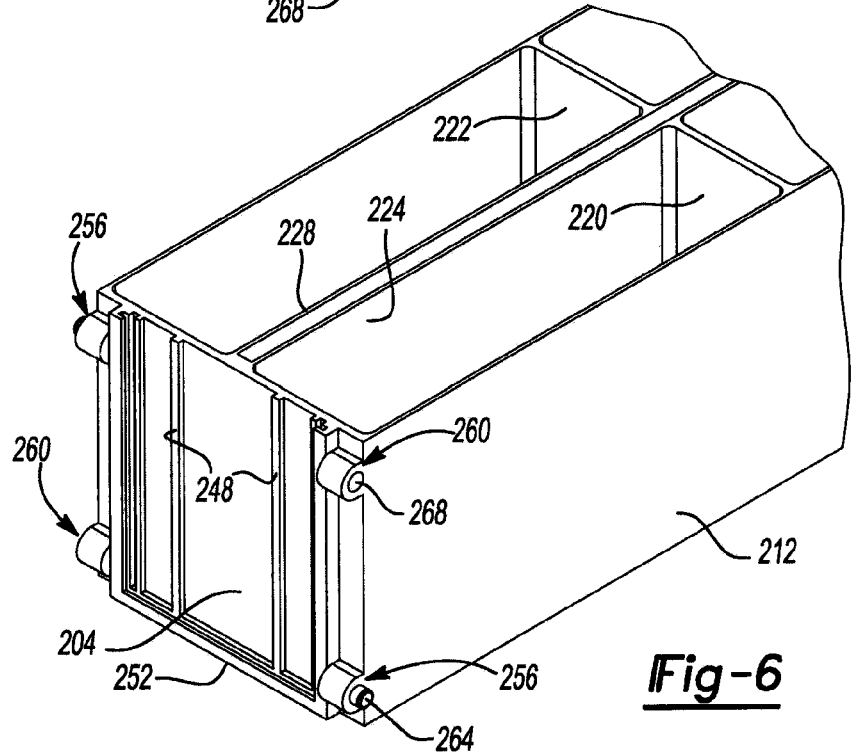

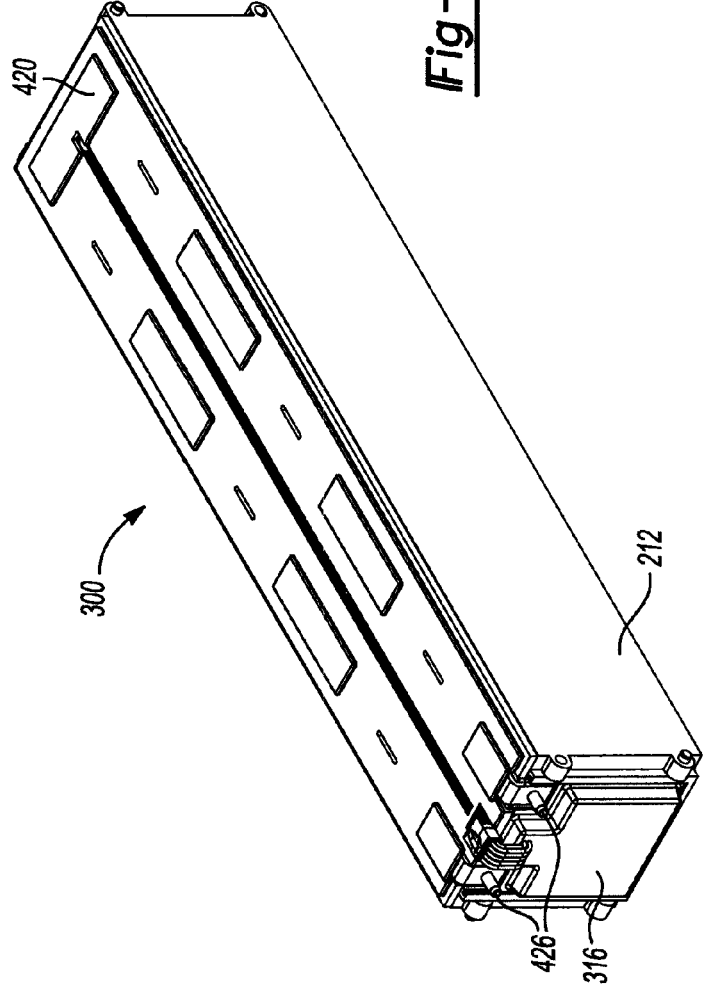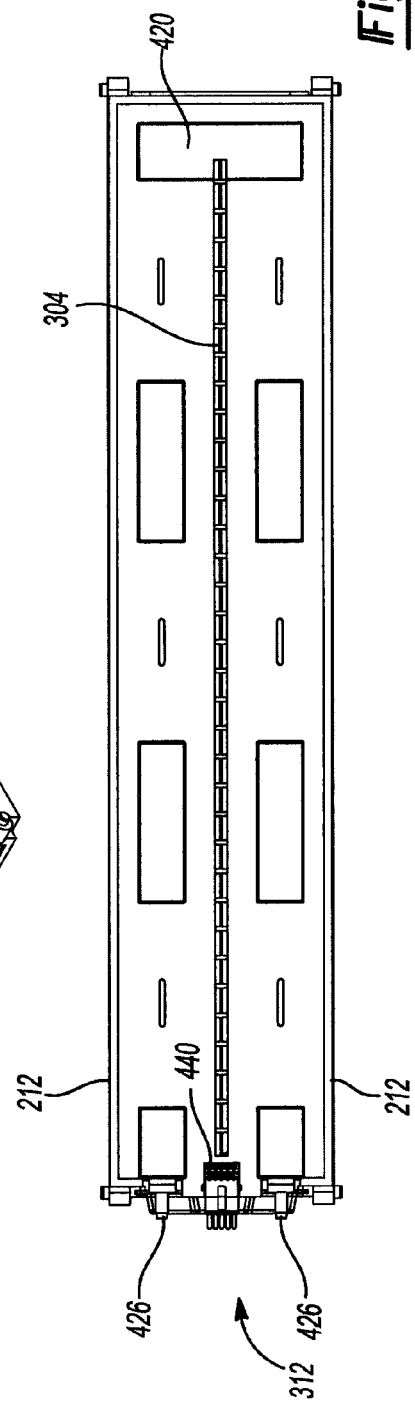

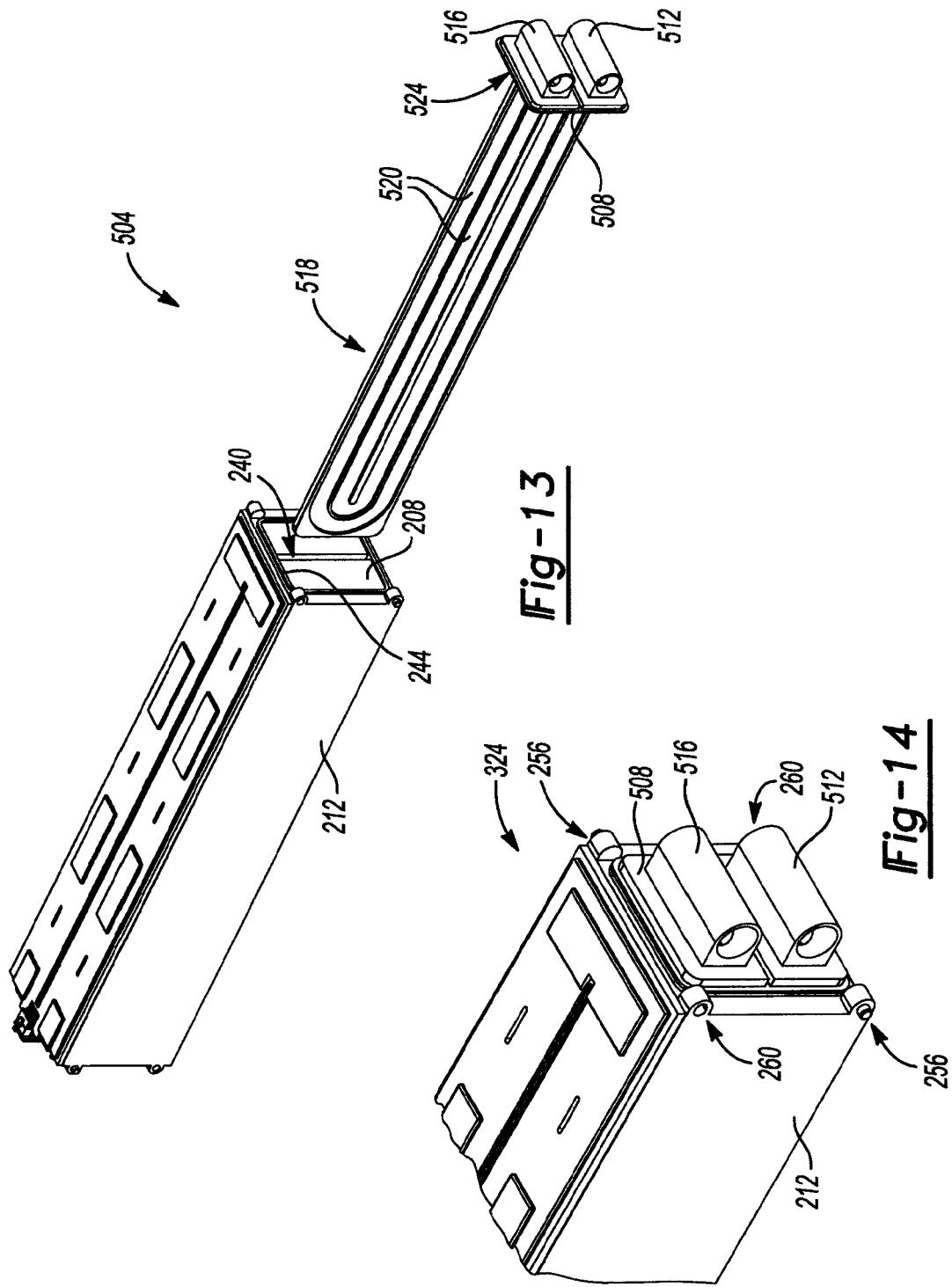

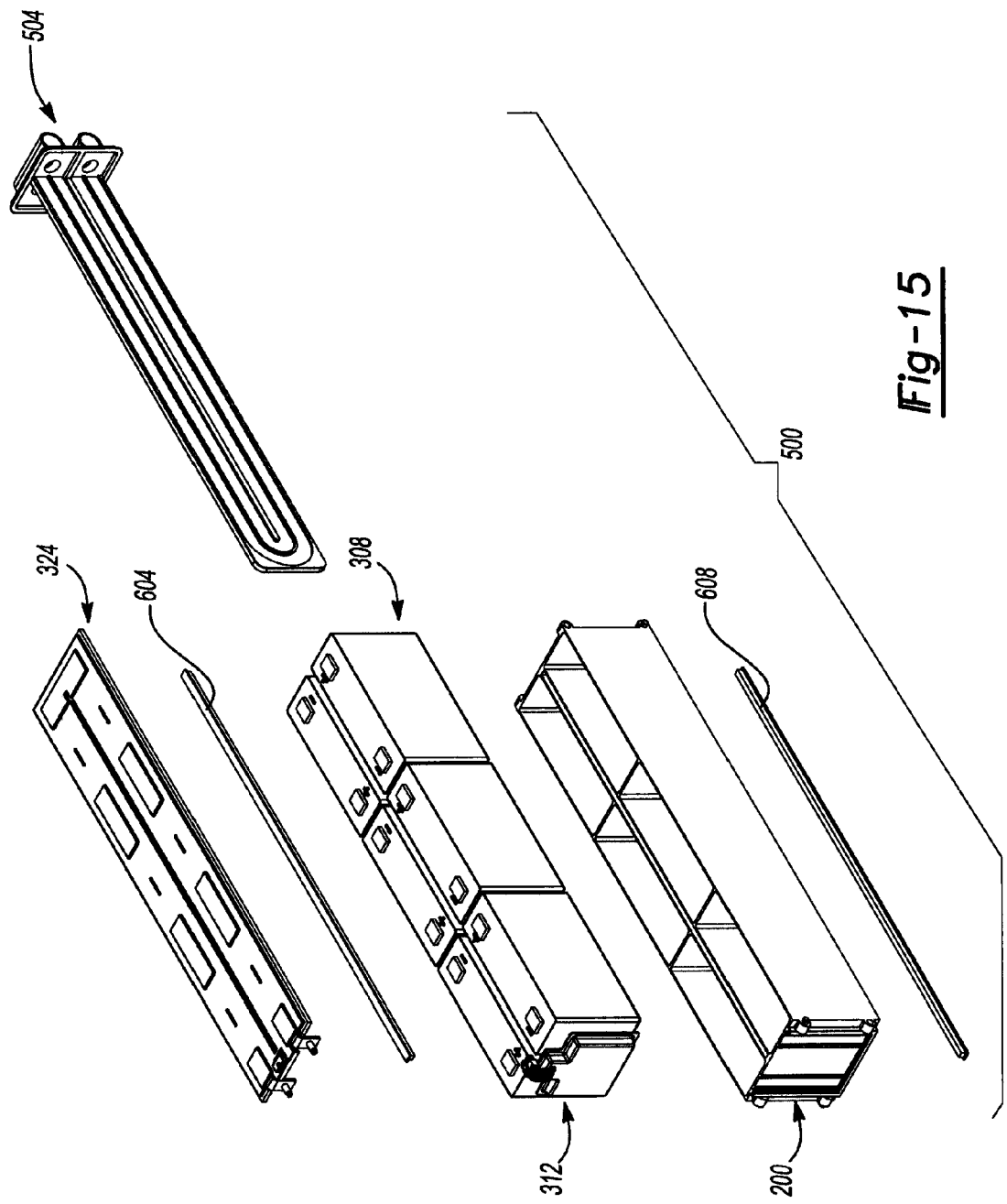

FLEXIBLE BATTERY MODULE FOR PRISMATIC CELLS

CROSS-REFERENCE TO RELATED APPLICATIONS

This application claims the benefit of U.S. Provisional Application No. 61/431,132, filed on Jan. 10, 2011. The disclosure of the above application is incorporated herein by reference in its entirety.

FIELD

The present disclosure relates to battery modules for vehicles and more particularly to battery module systems for prismatic cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid electric vehicles (HEVs) and plug-in HEVs use multiple propulsion systems to provide motive power. The propulsion systems may include electric or battery powered systems that receive power from one or more battery modules. A battery module may include, for example, one or more banks of high-voltage cells (or batteries), such as lithium ion cells. The cells are volumetric building blocks of the battery module.

The operating temperature of a cell can affect the lifespan and performance (charging and discharging characteristics) of the cell. Regulating the operating temperature of a cell within a predetermined operating temperature range may maximize lifespan and performance of the cell.

Within a battery module, however, the operating temperatures of the cells may vary from cell to cell. Temperature variations can arise between the cells of a battery module for various reasons. For example only, temperature variations can arise due to manufacturing differences between the cells, differences in locations of the cells within the battery module, thermal path differences of each cell, and other reasons. It can be difficult to maintain each of the cells of a battery module within the predetermined operating temperature range.

SUMMARY

In an embodiment, a modular frame for a battery module includes: a floor; end walls that are perpendicular to the floor; and side walls that are perpendicular to the floor and that are perpendicular to the end walls. The modular frame also includes: interior walls that extend between the end walls, that are perpendicular to the floor, and that are perpendicular to the end walls; a first space within the modular frame that is defined by the floor, the end walls, a first one of the side walls, and a first one of the interior walls and that is adapted to receive N prismatic cells. N is an integer greater than zero. The modular frame also includes a second space within the modular frame that is defined by the floor, the end walls, a second one of the side walls, and a second one of the interior walls and that is adapted to receive N other prismatic cells of the battery module. The first and second ones of the side walls are different. The first and second ones of the interior walls are different. The modular frame also includes a chamber that is disposed between the interior walls; a first aperture to the chamber, wherein the first aperture is defined by the interior walls and the side walls; and a second aperture to the chamber, wherein the second aperture is formed through one of the end walls.

In an embodiment, a modular frame for a battery module includes: a floor that includes an electrically non-conductive material; end walls that are perpendicular to the floor and that include the electrically non-conductive material; and side walls that are perpendicular to the floor, that are perpendicular to the end walls, and that include the electrically non-conductive material. The modular frame further includes interior walls that include the electrically non-conductive material and that define: a first row of cell slots configured to receive a first plurality of prismatic cells of the battery module; a second row of cell slots configured to receive a second plurality of prismatic cells of the battery module; and a chamber disposed between the first and second rows of cell slots. The modular frame further includes a first aperture to the chamber, wherein the first aperture is defined by the interior walls and the side walls; and a second aperture to the chamber, wherein the second aperture is formed through one of the end walls.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a prismatic cell;

FIG. 2 is a perspective view of an example modular frame that houses six of the prismatic cells;

FIG. 3 includes a top view of the modular frame;

FIGS. 4-6 include other perspective views of the modular frame;

FIGS. 10-11 include perspective views of the battery module;

FIG. 12 includes a top view of the battery module;

FIGS. 13-14 include perspective views of a second example battery module including the modular frame and a liquid cooling member;

FIG. 15 includes an exploded view of the second battery module;

DETAILED DESCRIPTION

Figure 7:
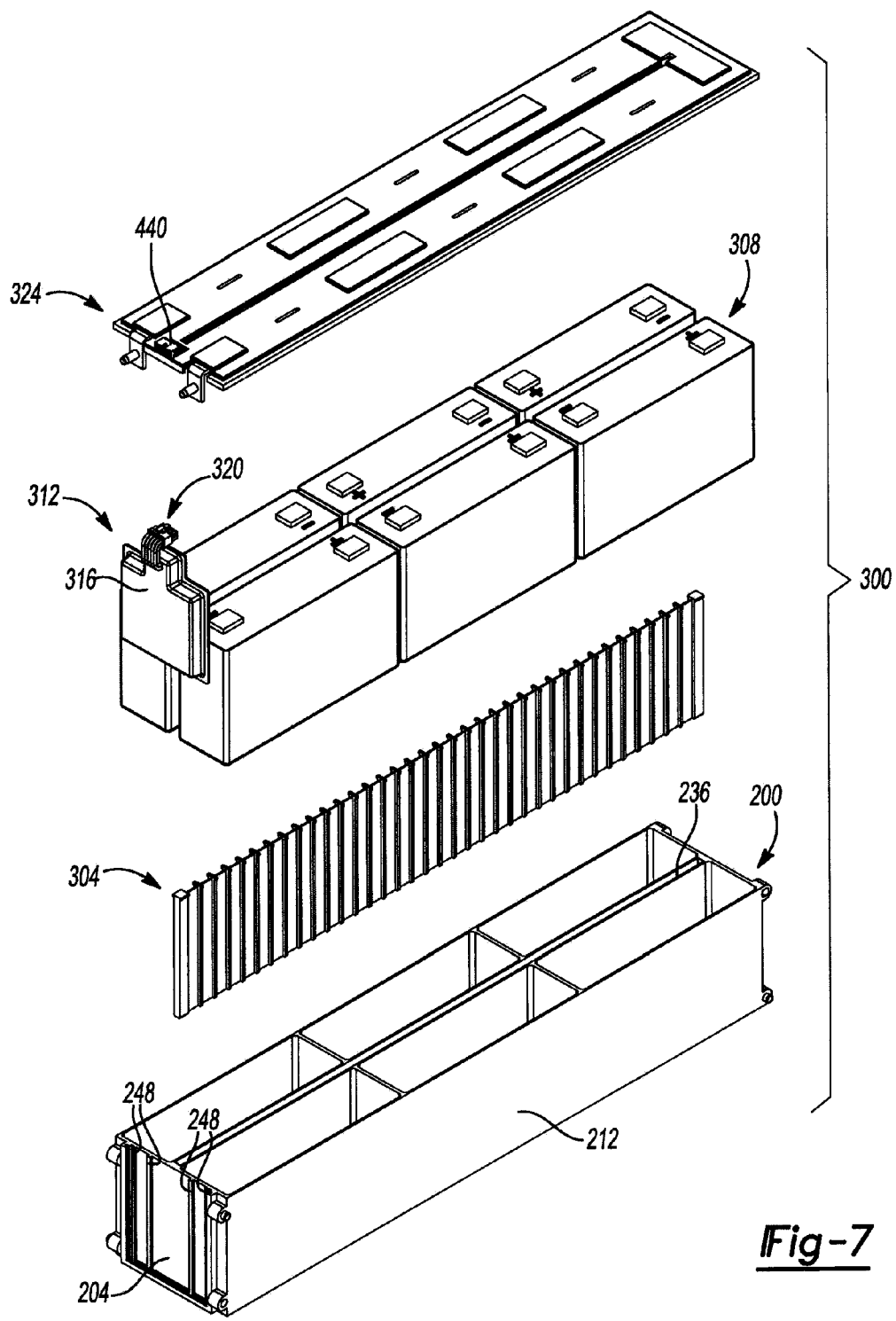
FIG. 7 includes an exploded view of an example battery module including the modular frame and an air cooling member.

In the following description, a modular frame for a battery module is disclosed. The modular frame is shown and described as an example, and one or more characteristics of the modular frame may be modified based on a particular application. For example, the modular frame may be scaled up or down to accommodate a different number of cells. Additionally or alternatively, the modular frame may be modified to accommodate cells having a different size and/or shape. Additionally or alternatively, the modular frame may be modified to accommodate a different arrangement of cells within the modular frame. The modular frame may be formed of an (electrically) non-conductive material, such as polypropylene (PPE). The modular frame aids in isolating the cells from each other, from other system components, and from foreign materials or objects.

A modular frame of a battery module includes slots for a plurality of prismatic cells to be inserted into the modular frame. The slots are arranged in rows where each row includes an equal number of slots. For example, the slots may be arranged in two rows of N slots, where N is an integer greater zero.

The modular frame also includes a cooling chamber that is disposed between two adjacent rows of slots. A cooling member can be inserted into the cooling chamber to cool the cells of the two adjacent rows. The cooling member can be, for example, an air cooling member, a liquid cooling member, or a phase change material cooling member.

Air cooling members may provide cooling using airflow through the air cooling member. Liquid cooling members may provide cooling using a liquid coolant that flows through the liquid cooling member. Phase change cooling members may provide cooling using a material that changes from one phase to another phase (e.g., solid to liquid or liquid to gas) in response to the receipt of heat.

The modular frame of the present application includes a first aperture to the cooling chamber. The modular frame also includes a second aperture. The first aperture is defined by walls of the modular frame. An air cooling member or a phase change cooling member can be inserted into the cooling chamber via the first aperture. The second aperture is formed through an end wall of the modular frame. A liquid cooling member can be inserted into the cooling chamber via the second aperture.

Because the modular frame is adapted to receive air, phase change, and/or liquid cooling members, different variations of the modular frame need not be made to accommodate the use of different types of cooling members. More specifically, one type of modular frame that is adapted to receive an air cooling member, one type of modular frame that is adapted to receive a liquid cooling member, and one type of modular frame that is adapted to receive a phase change cooling member need not be made.

In FIG. 1, a perspective view of a prismatic cell (hereafter "cell") 100 is shown. The cell 100 may include, for example, a rectangular shaped, lithium-ion cell with a housing (or can) 104. As an example, the can may be formed of aluminum or another (electrically) conductive material.

The cell 100 further includes a pair of terminals 108 that extend from the cell 100. The terminals 108 may include, for example, cylindrical terminals, threaded terminals, flat terminals, or another suitable type of terminal. The cell 100 may be charged and electrical energy may be drawn from the cell 100 via the terminals 108. A positive one of the terminals 108 may be connected to the housing 104. The cell 100 and one or more other cells can be connected in series, in parallel, or combinations thereof as discussed further below.

A release vent 112 may be located on a top surface 116 of the cell 100. The cell 100 also includes a bottom surface 120. The release vent 112 opens and releases gas from within the cell 100, for example, when the cell 100 is overcharged. The release vent 112 may include: a membrane that ruptures; a valve that opens; a plug that separates from the cell 100; and/or one or more other suitable venting elements.

The cell 100 has a height 124 (between the top and bottom surfaces 116 and 120), a length 128, and a width 132. The cell 100 includes faces 136. The terminals 108 extend upward from the top surface 116. The dimensions of the height 124, the length 128, the width 132, and the faces 136 are shown as examples only, and the dimensions of one or more of the height 124, the length 128, the width 132, and the faces 136 may be different.

Referring now to FIGS. 2-6, various views of an example modular frame 200 of a battery module are presented. The modular frame 200 may be formed of a plastic material, such as polypropylene (PPE) or another suitable type of plastic material that is electrically non-conductive and that includes a suitably high thermal conductivity. The modular frame 200, including the features of the modular frame 200 described herein, may be formed from the plastic material via injection molding or another suitable process.

The modular frame 200 includes a first end wall 204, a second end wall 208, and side walls 212. The first and second end walls 204 and the side walls 212 extend generally perpendicular to a plane formed by a bottom portion 214 of the modular frame 200.

The modular frame 200 includes P slots 216 for receiving P prismatic cells, such as the cell 100. The modular frame 200 can include six slots as shown or another suitable number of slots. The slots are arranged in two rows with an equal number of slots in each row. P is an even integer and is greater than or equal to two. For example only, may be 6 as in the example shown or another suitable value. While the modular frame 200 is shown and will be discussed in conjunction with the use of cells like the cell 100, the modular frame 200 may be adapted to accommodate cells of different dimensions and different arrangements of cells.

The slots 216 are defined by the first and second end walls 204 and 208, the side walls 212, and interior walls 220, 222, 224, and 228. The interior wall 224 is connected to and extends generally perpendicular to the first and second end walls 204 and 208. The interior wall 228 is connected to and extends generally perpendicular to the first and second end walls 204 and 208. The interior walls 224 and 228 are generally parallel.

The interior walls 220 are connected to and extend generally perpendicular to one of the side walls 212 and the interior wall 224. The interior walls 222 are connected to and extend generally perpendicular to the interior wall 228 and the other one of the side walls 212. The walls of the modular frame 200 form the slots 216 including apertures through which the cells can be inserted into the slots 216.

The heights of the first and second end walls 204 and 208, the side walls 212, and the interior walls 220, 222, 224, and 228 may be approximately equal to the height 124 of the cells. In this manner, the terminals of the cells extend above the first and second end walls 204 and 208, the side walls 212, and the interior walls 220, 222, 224, and 228 for connection of the cells in series, in parallel, or a combination thereof as discussed further below.

The modular frame 200 also includes floor portions 232 upon which the bottom portions of the cells rest once the cells have been inserted into the slots 216 formed in the modular frame 200. The interior walls 224 and 228 are separated from each other by a distance and define an aperture 236. An aperture 240 is formed through the second end wall 208. A cooling chamber (not individually numbered) defined by the interior walls 224 and 228 and the end walls 204 and 208 can be accessed via the aperture 236 and the aperture 240.

A cooling member can be inserted into the cooling chamber via the aperture 236 or the aperture 240 to provide cooling. For example, an air cooling member (e.g., see FIG. 7) or a phase change cooling member can be inserted into the cooling chamber via the aperture 236. The phase change cooling member may include, for example, a block including a mesh (e.g., a carbon based mesh) and a wax material where the wax changes phase based on temperature. A liquid cooling member (e.g., see FIG. 13) can alternatively be inserted into the cooling chamber via the aperture 240.

The modular frame 200 therefore includes apertures through which one of a liquid cooling member, an air cooling member, or a phase change cooling member can be inserted between adjacent rows of slots for cells. Because the modular frame 200 is adapted to receive a liquid cooling member, an air cooling member, or a phase change cooling member, variations of the modular frame 200 need not be produced for liquid cooling members, air cooling members, and phase change cooling members. Whether liquid cooling, air cooling, or phase change material cooling is used may be selected based on the application. The walls of the modular frame 200 may be arranged such that larger faces of the cells (if the cells have rectangular faces) contact the interior walls 224 and 228 and the side walls 212. This may help maximize heat transfer away from the cells.

A raised portion 244 may be formed on the second end wall 208. The raised portion 244 is raised relative to the second end wall 208. A liquid cooling member may be joined to the modular frame 200 via the raised portion 244 as discussed further below.

One or more raised channels, such as raised channels 248, may be formed on the first end wall 204. The raised channels 248 are raised relative to the first end wall 204. A raised stop 252 may also be formed on the first end wall 204. The raised stop 252 is also raised relative to the first end wall 204. A controller (e.g., see FIGS. 7 and 15) may include one or more grooved portions that are adapted to receive the raised channels 248 as to hold the controller in abutment with the first end wall 204 as discussed further below. The raised stop 252 may provide a lower boundary for the controller to rest upon.

Two or more connecting members may be formed on each of the first and second end walls 204 and 208. More specifically, one or more male connecting members 256 and one or more female connecting members 260 may be formed on each of the first and second end walls 204 and 208. For example only, two connecting members and two female connecting members may be formed on each of the first and second end walls 204 and 208 as shown. The connecting members formed on one of the first and second end walls 204 and 208 are raised relative to the one of the first and second end walls 204 and 208.

The male connecting members 256 include male members 264 that are raised relative to an associated one of the side walls 212. The female connecting members 260 include female members 268 that are recessed relative to an associated one of the side walls 212. For example only, the male members 264 may include cylindrical shaped projections and the female members 268 may include cylindrically shaped bosses as shown or another suitable shape.

Where a male connecting member is formed at a location on an end wall such that its male member is raised relative to an associated one of the side walls 212, a female connecting member is formed at a corresponding location on the end wall such that its female member is recessed relative to the other one of the side walls 212. Conversely, where a female connecting member is formed at a location on an end wall such that its female member is recessed relative to one an associated one of the side walls 212, a male connecting member is formed at a corresponding location on the end wall such that its male member is raised relative to the other one of the side walls 212. In this manner, a component (e.g., an external cooling member or another modular frame like the modular frame 200) having the same arrangement of female and male connecting members can be connected with the modular frame 200 via the corresponding female and male connecting members as discussed further below (e.g., see FIGS. 18-23 and 25-26).

Referring now to FIG. 7, a perspective view of an example battery module 300 including the modular frame 200 and an air cooling member 304 is presented. The air cooling member 304 may be inserted into the cooling chamber between the interior walls 224 and 228. The air cooling member 304 is inserted between the interior walls 224 and 228 through the aperture 236. The air cooling member 304 includes channels through which air can flow. A fan, blower, or another air moving device (not shown) may be implemented to facilitate airflow through the air cooling member 304 and one or more other air cooling members.

The air cooling member 304 may be formed from the same plastic material as the modular frame 200 or another material that includes a suitably high thermal conductivity. The air cooling member 304 may be formed from via injection molding or another suitable process. Portions of the air cooling member 304 that contact the interior walls 224 and 228 may provide structural support and resist compressive forces on the cells.

The cells, collectively illustrated by 308, are inserted into the slots 216 formed in the modular frame 200. The cells 308 may be maintained within the modular frame 200 in part by an interference fit between the cells 308 and the walls of the modular frame 200. As stated above, the terminals of the cells 308 slightly above the walls of the modular frame 200.

A controller/connection module 312 may be attached to the first end wall 204 of the modular frame 200. The controller/connection module 312 may include a controller 316 and a connection assembly 320. The controller 316 includes one or more grooves that are adapted to receive the raised channels 248 formed on the first end wall 204. The controller 316 may rest upon the raised stop 252. The connection assembly 320 includes a plurality of wires and a connector. The wires are connected between the controller 316 and the connector.

Figure 8:
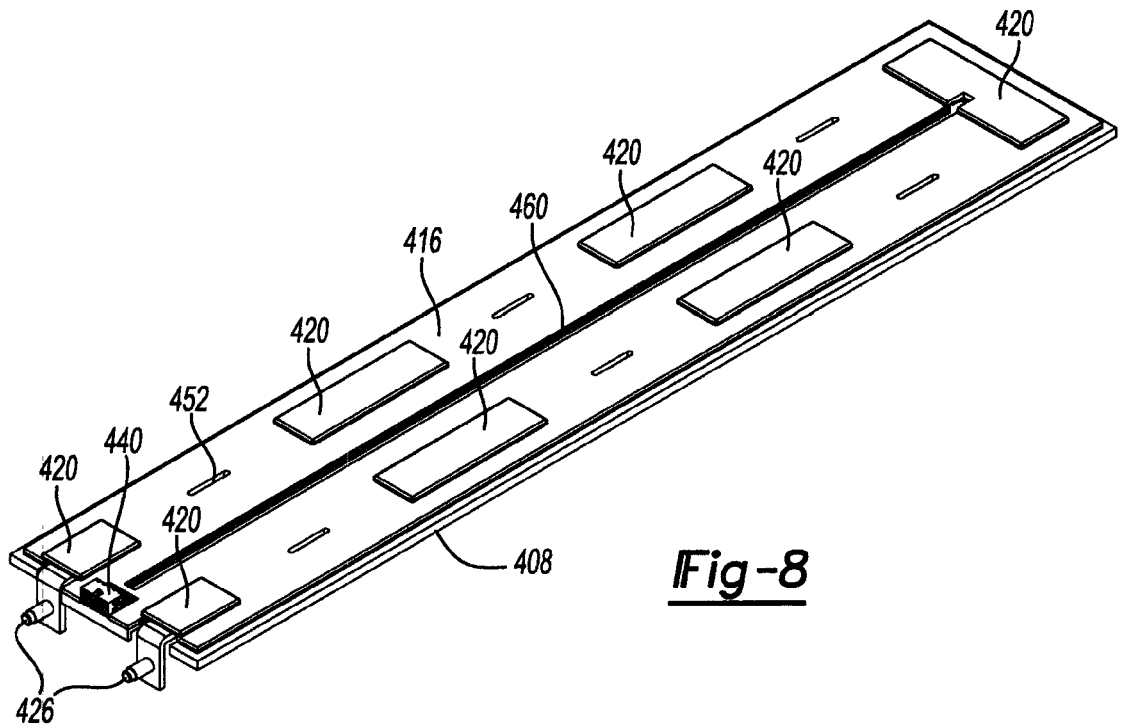
FIG. 8 includes a perspective view of an example interconnection assembly of the battery module.
Figure 9:
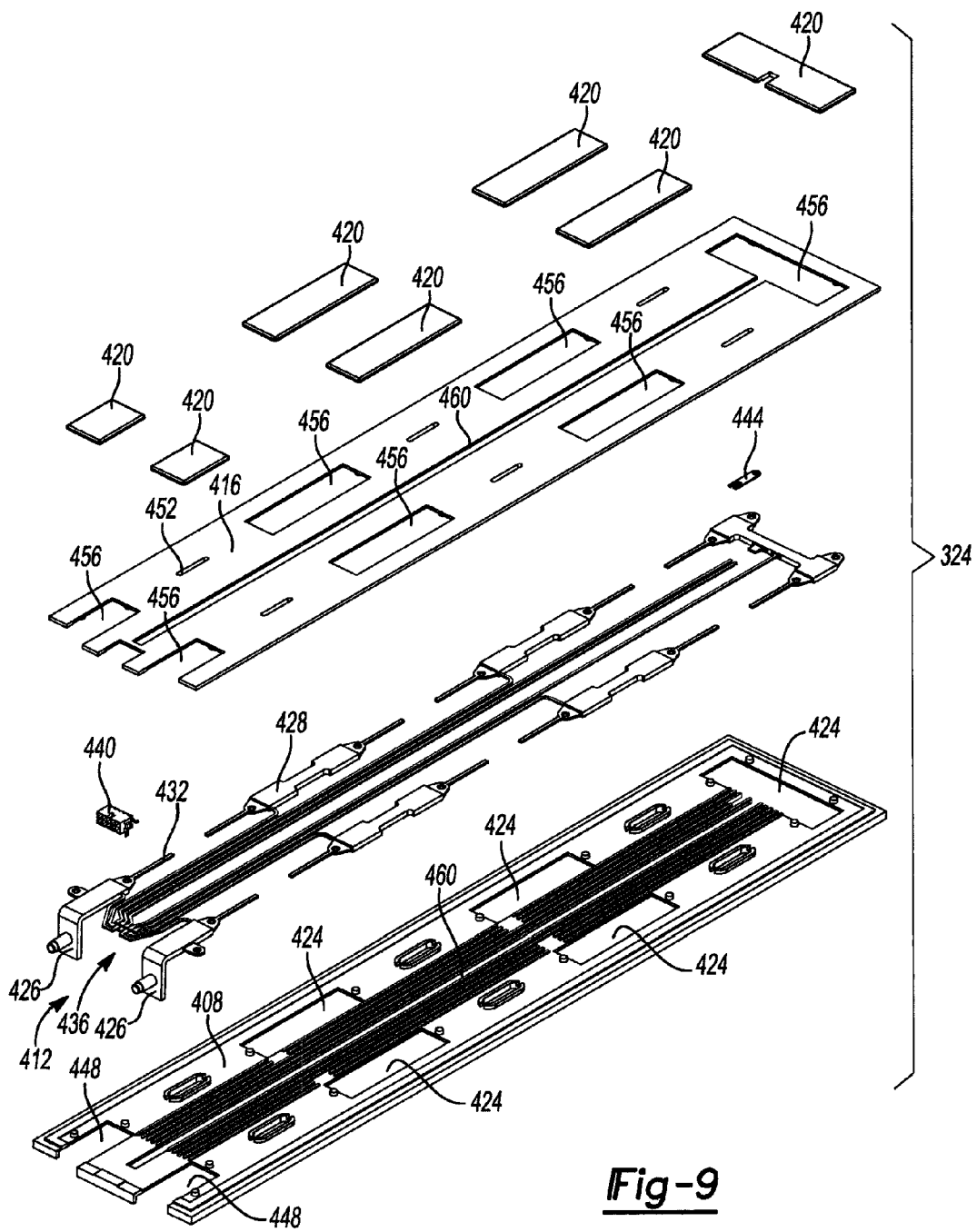
FIG. 9 includes an exploded view of the interconnection assembly.

The battery module 300 also includes an interconnection assembly 324. FIG. 8 includes a perspective view of the interconnection assembly 324. FIG. 9 includes an example exploded view of the interconnection assembly 324. The controller 316 connects to the interconnection assembly 324 via the connector to receive various measurements (e.g., voltage, temperature, etc.) at various locations within the battery module 300.

Referring now to FIGS. 7-9, the interconnection assembly 324 includes a base frame member 408, an interconnection frame member 412, a cover frame member 416, and safety covers 420. The base frame member 408 and the cover frame member 416 may be made of the same plastic material as the modular frame 200 or another suitable electrically non-conductive material. The base frame member 408 and the cover frame member 416 may be formed from the plastic material via injection molding or another suitable process.

The base frame member 408 rests upon top surfaces of the walls of the modular frame 200. The base frame member 408 may also include a rim that extends past the walls of the modular frame 200 and that engages external surfaces of the walls of the modular frame 200. The interconnection assembly 324 is joined with the modular frame 200. The interconnection assembly 324 can be joined with the modular frame 200, for example, using welding (e.g., vibration, ultrasonic, hotplate, laser, etc.), using one or more adhesives (e.g., an epoxy), or using another suitable joining technique.

The base frame member 408 includes apertures 424 through which terminals of the cells extend. The terminals of the cells can be accessed to electrically connect the cells, for example, in series, in parallel, or a combination thereof via the apertures 424. The interconnection frame member 412 includes main terminals 426, bus bars, such as bus bar 428, leads, such as lead 432, wires collectively illustrated by 436, a connector 440, and one or more temperature sensors, such as temperature sensor 444.

The main terminals 426, the bus bars, and the leads can be formed from an electrically conductive material (e.g., copper or aluminum) and can be provided with the wires 436, the connector 440, and the temperature sensor(s) attached. The interconnection frame member 412 may also be implemented upon a printed circuit board (PCB), such as a rigid PCB or a flexible PCB.

The interconnection frame member 412 is integrated within the interconnection assembly 324 between the base frame member 408 and the cover frame member 416, which are electrically non-conductive. The base frame member 408 may be joined with the cover frame member 416, for example, using welding, one or more adhesives, or using another suitable joining technique.

The main terminals 426 contact two terminals of the cells 308 via apertures 448 formed through the base frame member 408. Power (electrical) can be input to or drawn from the battery module 300 via the main terminals 426. The main terminals 426 may be joined with the two terminals, respectively, for example, using welding. The bus bars or other suitable electrical conductors may be joined with the terminals to electrically connect the cells 308. The bus bars may, for example, be welded to the terminals.

The leads are electrically connected to the bus bars. The leads may be accessed via apertures, such as aperture 452, formed through the cover frame member 416. For example only, the lead 432 can be accessed through the aperture 452. The leads may be accessed, for example, using a voltage probe to measure voltages at various locations within the battery module 300. The wires 436 are connected between the connector 440 and various locations or temperature sensors.

The connector of the controller/connection module 312 mates with the connector 440. In this manner, the controller 316 receives various measurements at various locations within the battery module 300.

The cover frame member 416 includes apertures 456 through which the bus bars and the main terminals 426 can be accessed. The apertures 456 through the cover frame member 416 are aligned with the apertures 424 and 448 through the base frame member 408. The apertures 456 and the apertures 424 and 448 allow the terminals of the cells 308 to extend at least partially through the interconnection assembly 324. This may enable an overall height of the battery module 300 to be minimized.

The safety covers 420 can be joined with the cover frame member 416 to cover the apertures 456, the main terminals 426 from above, and the bus bars. The safety covers 420 can be joined with the cover frame member 416, for example, using welding, one or more adhesives, or another suitable joining technique. The safety covers 420 may be made of the same plastic material as the modular frame 200 or another suitable electrically non-conductive material.

Figure 10:
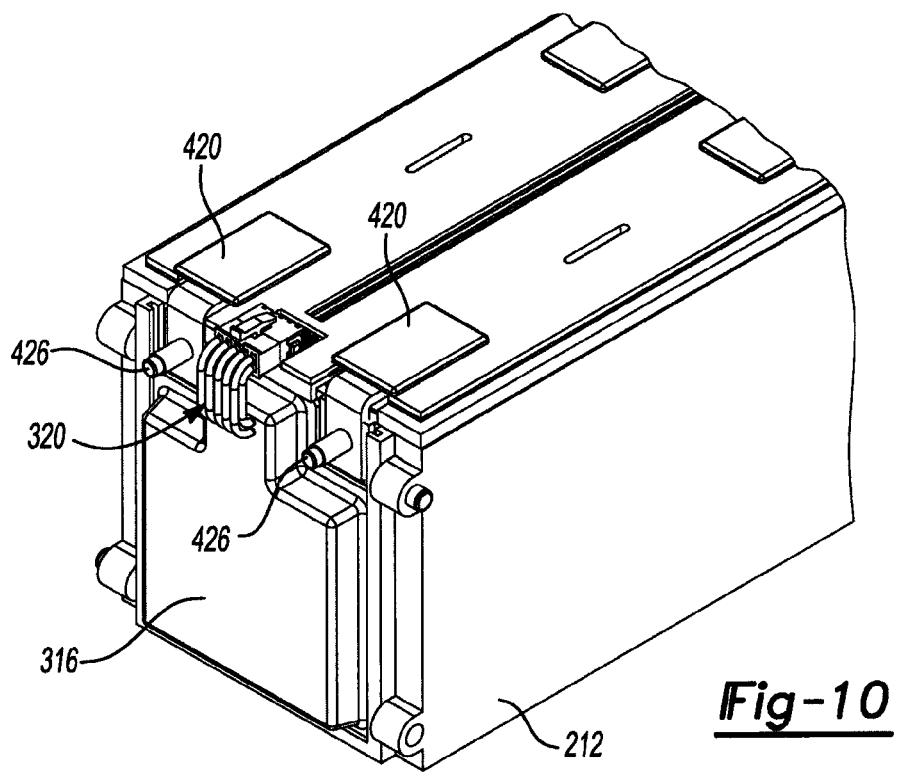

The base frame member 408 and the cover frame member 416 also include airflow apertures 460 that are aligned with the aperture 236. Air can flow through the interconnection assembly 324 via the airflow apertures 460, past the air cooling member 304, and out of the modular frame 200, or vice versa. As air flows past the air cooling member 304, the air absorbs heat from the air cooling member 304, thereby cooling the air cooling member 304 so the air cooling member 304 can absorb more heat from the cells and the modular frame 200. FIGS. 10-12 include other example views of the battery module 300.

Referring now to FIG. 13, a perspective view of an example battery module 500 including the modular frame 200, the interconnection assembly 324, and a liquid cooling member 504 is presented. The liquid cooling member 504 may be formed from the same plastic material as the modular frame 200 or another suitable material that is chemically resistant to the coolant used. The liquid cooling member 504 may be formed, for example, using injection molding or another suitable process.

The liquid cooling member 504 includes a face plate 508, a coolant inlet 512, and a coolant outlet 516. The liquid cooling member 504 also includes a cooling plate 518 and one or more coolant channels 520 formed through the cooling plate 518. The cooling plate 518 is inserted into the cooling chamber within the modular frame 200 through the aperture 240 formed on the second end wall 208. Portions of the cooling plate 518 that contact the interior surfaces of the interior walls 224 and 228 may provide structural support and resist compressive forces on the cells.

An interior surface 524 of the face plate 508 contacts the raised portion 244 formed on the second end wall 208. FIG. 14 includes a perspective view including the battery module 500 when the face plate 508 is in contact with the raised portion 244 of the second end wall 208. The liquid cooling member 504 is joined with the modular frame 200. The liquid cooling member 504 may be joined with the modular frame 200, for example, by joining the face plate 508 with the raised portion 244 formed on the second end wall 208. The liquid cooling member 504 may be joined with the modular frame 200, for example, using welding, one or more adhesives, or another suitable joining technique.

A coolant pump (not shown) or another source of liquid coolant provides coolant to the liquid cooling member 504. The coolant may also be provided to one or more other liquid cooling members, as discussed further below. The coolant flows into the one or more coolant channels 520 via the coolant inlet 512. The one or more coolant channels 520 are connected between the coolant inlet 512 and the coolant outlet 516. The coolant may absorb heat from surfaces that are warmer than the coolant. The coolant flows out of the one or more coolant channels 520 via the coolant outlet 516.

Referring now to FIG. 15, an example exploded view of the battery module 500 is presented. When a phase change cooling member or a liquid cooling member, such as the liquid cooling member 504, is inserted into the cooling chamber for cooling, the battery module 500 includes a top cap 604 and a bottom cap 608. The top and bottom caps 604 and 608 may be formed, for example, from the same plastic material as the modular frame 200 or another suitable electrically non-conductive material. The top and bottom caps 604 and 608 may be formed, for example, using injection molding or another suitable process.

The top and bottom caps 604 and 608 are joined to the modular frame 200 to seal the cooling chamber. In this manner, the apertures through which air would flow if an air cooling member was used are sealed to prevent liquid from leaking out of the modular frame 200. The top and bottom caps 604 and 608 may be joined with the modular frame 200, for example, using welding, one or more adhesives, or another suitable joining technique.

The liquid cooling member 504 can be inserted through the aperture 240 formed in the second end wall 208. The liquid cooling member 504 can be joined with the modular frame 200 to prevent liquid from leaking out of the modular frame 200 via the aperture 240. The cells 308 can be press fit into the slots 216. The controller/connection module 312 can be attached to the first end wall 204 via the grooves formed in the controller 316 and the raised channels 248 formed on the first end wall 204.

The interconnection assembly 324 can be attached including joining the interconnection assembly 324 with the modular frame 200, joining the integrated conductors with the terminals of the cells, and joining the safety covers 420 to cover the integrated conductors and the terminals. The connector of the controller/connection module 312 can be connected with the connector 440 that is integrated into the interconnection assembly 324.

Figure 16:
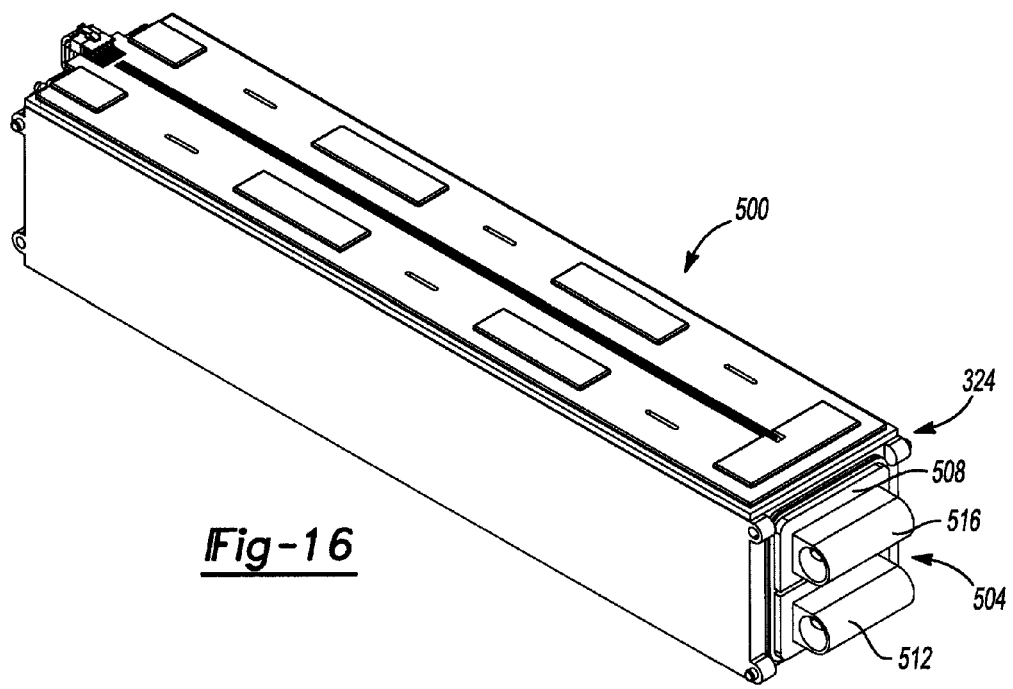
FIGS. 16-17 include perspective views of the second battery module.
Figure 17:
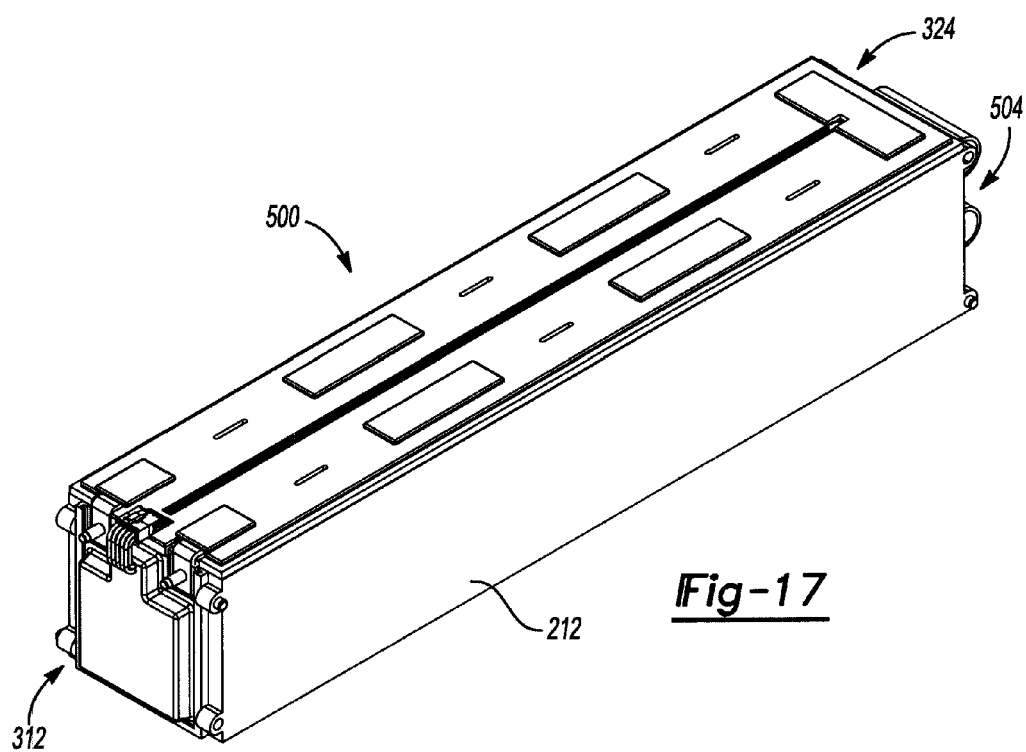

As the cooling chamber is sealed using the top and bottom caps 604 and 608, airflow through the aperture 460 formed in the interconnection assembly 324 is blocked. Other perspective views of the battery module 500 including the liquid cooling member 504 are provided in FIGS. 16 and 17.

Figure 18:
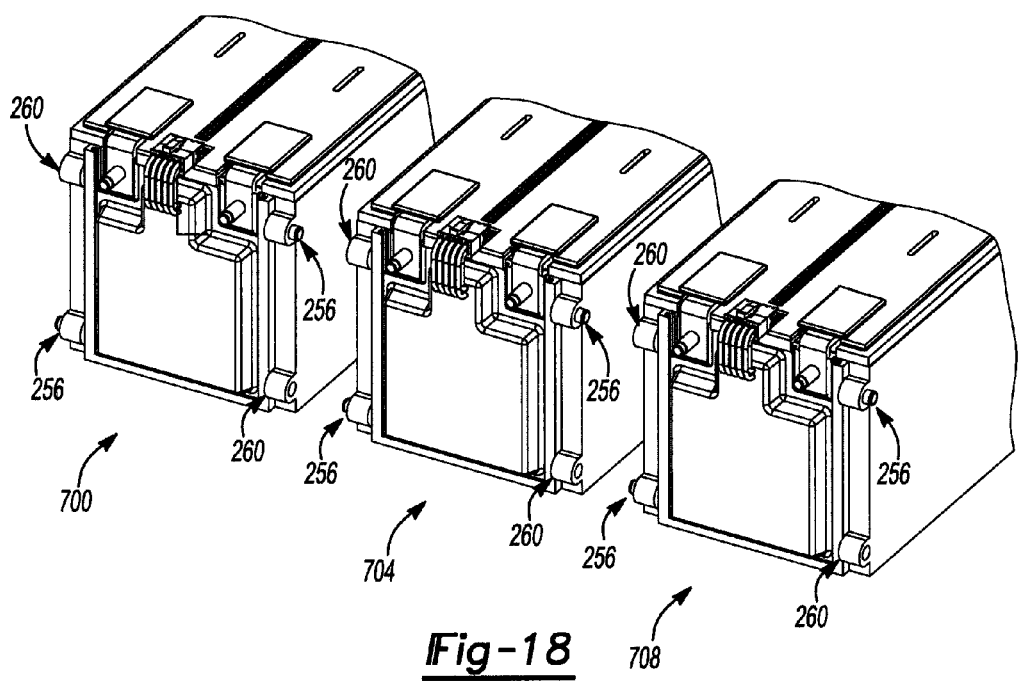
FIG. 18 includes a perspective view of a plurality of example battery modules.

One or more battery modules may be linked together to form a cassette. FIG. 18 includes an example perspective view of first, second, and third battery modules 700, 704, and 708 that each include a modular frame like the modular frame 200. While not shown, the battery modules 700, 704, and 708 each include a cooling member, such as an air cooling member, a liquid cooling member, or a phase change cooling member.

As the battery modules 700, 704, and 708 each include a modular frame like the modular frame 200, the battery modules 700, 704, and 708 each include the male and female connecting members 256 and 260 formed on each of their end walls (e.g., end walls 204 and 208). The battery modules 700, 704, and 708 can be positioned and moved toward each other such that the male connecting members 256 and the female connecting members 260 of one of the battery modules 700, 704, and 708 mate with the female connecting members 260 and the male connecting members 256, respectively, of an adjacent one of the battery modules 700, 704, and 708. For example only, the male connecting members 256 of the second battery module 704 mate with the female connecting members 260 of the first and third battery modules 700 and 708. The female connecting members 260 of the second battery module 704 concurrently mate with the male connecting members 256 of the first and third battery modules 700 and 708.

Figure 19:
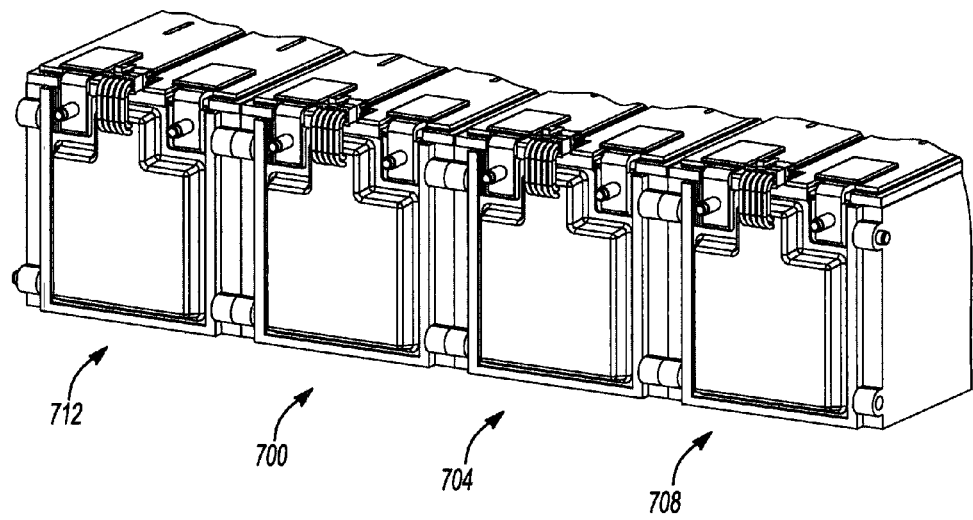
FIG. 19 includes a perspective view of a plurality of example battery modules with their modular frames connected together.

For example, FIG. 19 includes a perspective view including the battery modules 700, 704, and 708, and a fourth battery module 712. In the example of FIG. 19, the connecting members associated with one of the side walls of the first battery module 700 mate with the connecting members associated with one of the side walls of the second battery module 704. The connecting members associated with the other one of the side walls of the first battery module 700 mate with the connecting members associated with one of the side walls of the fourth battery module 712. The connecting members associated with the other one of the side walls of the second battery module 704 mate with the connecting members associated with one of the side walls of the third battery module 708.

Based on a desired amount of cooling, one or two faces of each cell of a battery module may be cooled. The air cooling member 304, the liquid cooling member 504, or a phase change member may be inserted within the cooling chamber of the modular frame 200 of a battery module to cool one face of each cell of the battery module. Additional external cooling members may be applied to the exterior surfaces of the side walls of the modular frame 200 to cool two faces of each cell of the battery module.

Figure 20:
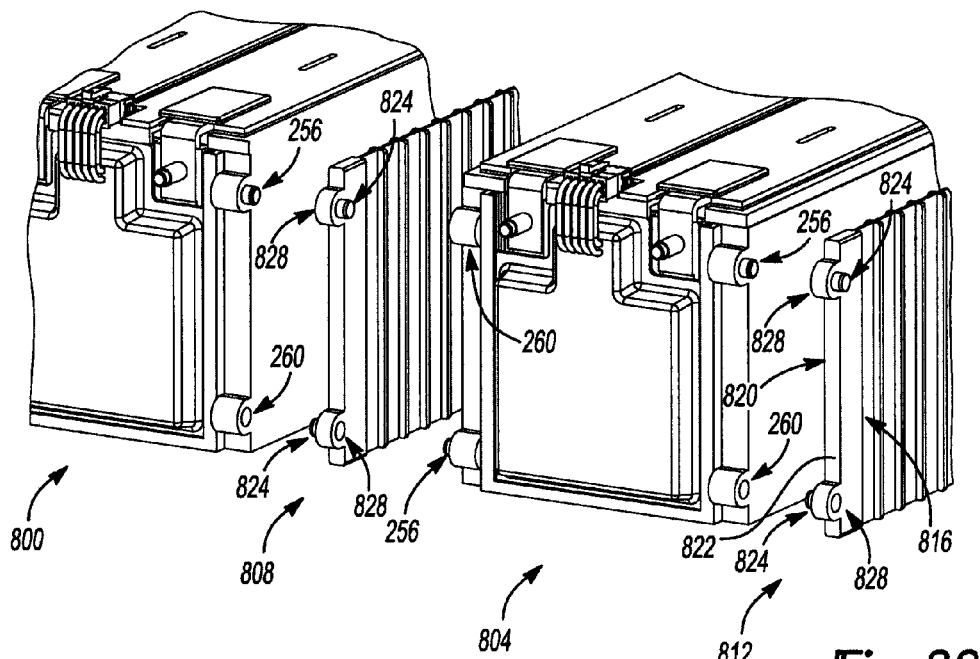
FIG. 20 includes a perspective view of a plurality of example battery modules and a plurality of external air cooling members.

For example, FIG. 20 includes a perspective view of first and second battery modules 800 and 804 and first and second exterior air cooling members 808 and 812. The first and second battery modules 800 and 804 each include an air cooling member. The first and second external air cooling members 808 and 812 may be formed from the same plastic material as the modular frame 200 or another suitable material that includes a suitably high thermal conductivity. The first and second external air cooling members 808 and 812 may be formed, for example, using injection molding or another suitable process. The first and second external air cooling members 808 and 812 each include channels through which air can flow.

The first and second external air cooling members 808 and 812 each include a first side 816 and a second side 820. The first and second external air cooling members 808 and 812 also each include a first end 822 and a second end (not shown) that are generally perpendicular to the first and second sides 816 and 820. The first and second external air cooling members 808 each include one or more male connecting members 824 and one or more female connecting members 828 formed on each of the first and second ends.

The arrangement of the male and female connecting members 824 and 828 formed on the first and second ends of the external air cooling members 808 and 812 is the same as the arrangement of the male and female connecting members 256 and 260 formed on the first and second end walls 204 and 208 of the modular frame 200. The male and female connecting members 824 and 828 therefore can be mated with the female and male connecting members 260 and 256 of the modular frame 200 and one or more other components having the same arrangement of connecting members.

Figure 21:
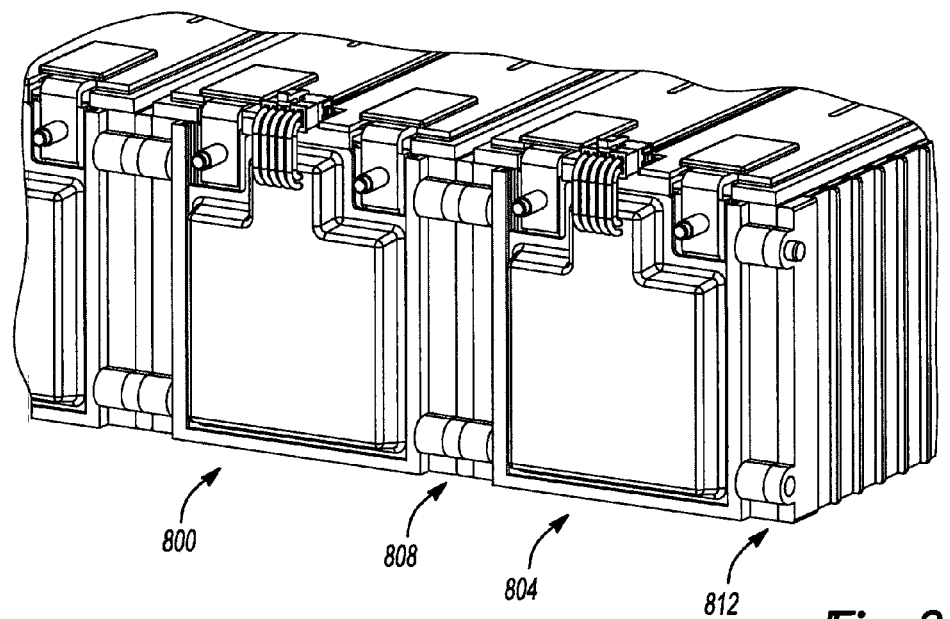
FIG. 21 includes a perspective view of a plurality of example battery modules connected with external air cooling members.
Figure 22:
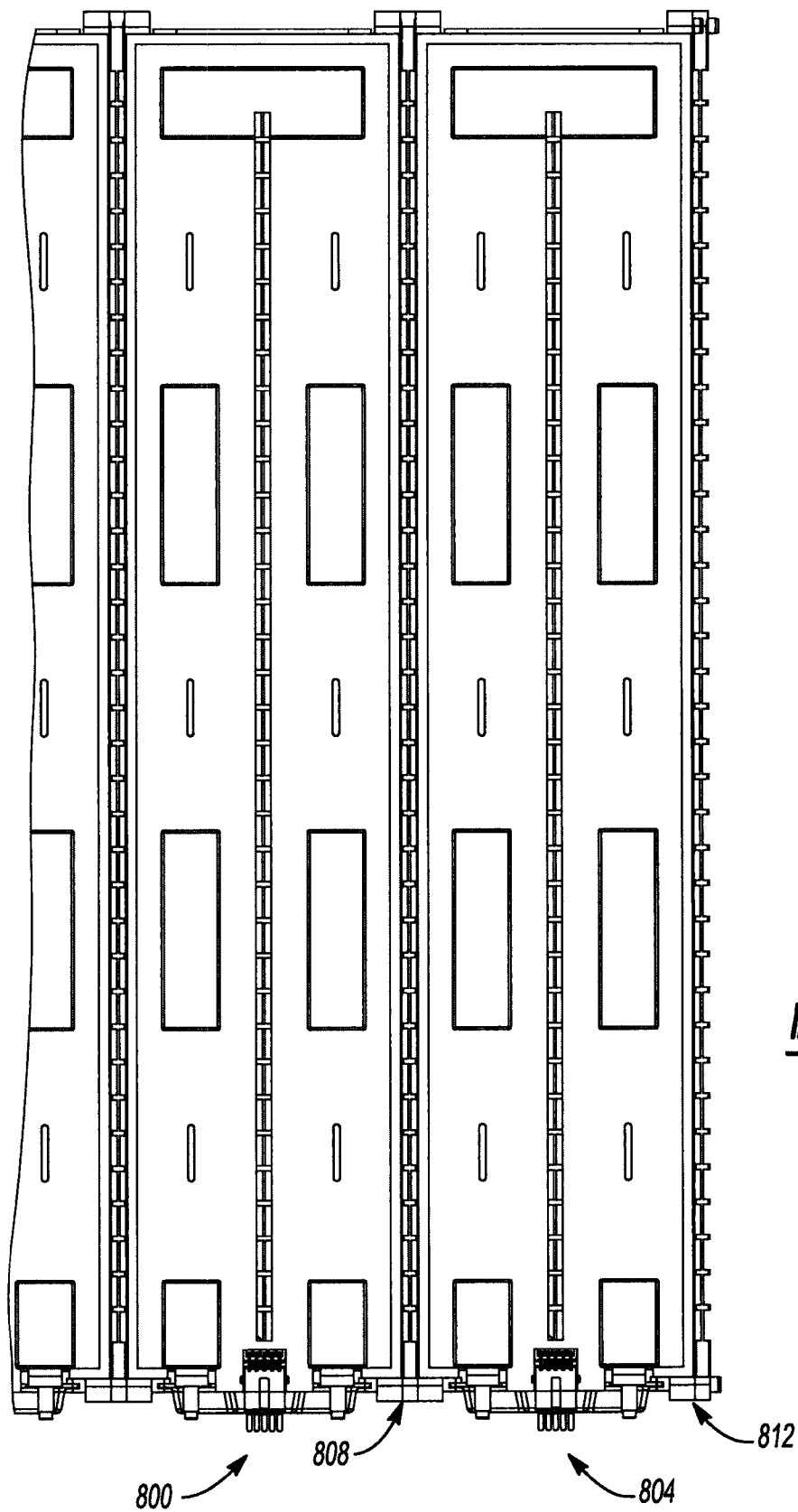
FIG. 22 includes a top view of a plurality of example battery modules connected with external air cooling members.

For example, FIG. 21 includes an example perspective view of the first and second battery modules 800 and 804 connected with the first and second external air cooling members 808 and 812 via their connecting members. FIG. 22 includes an example top view of the first and second battery modules 800 and 804 connected with the first and second external air cooling members 808 and 812 via their connecting members.

Figure 23:
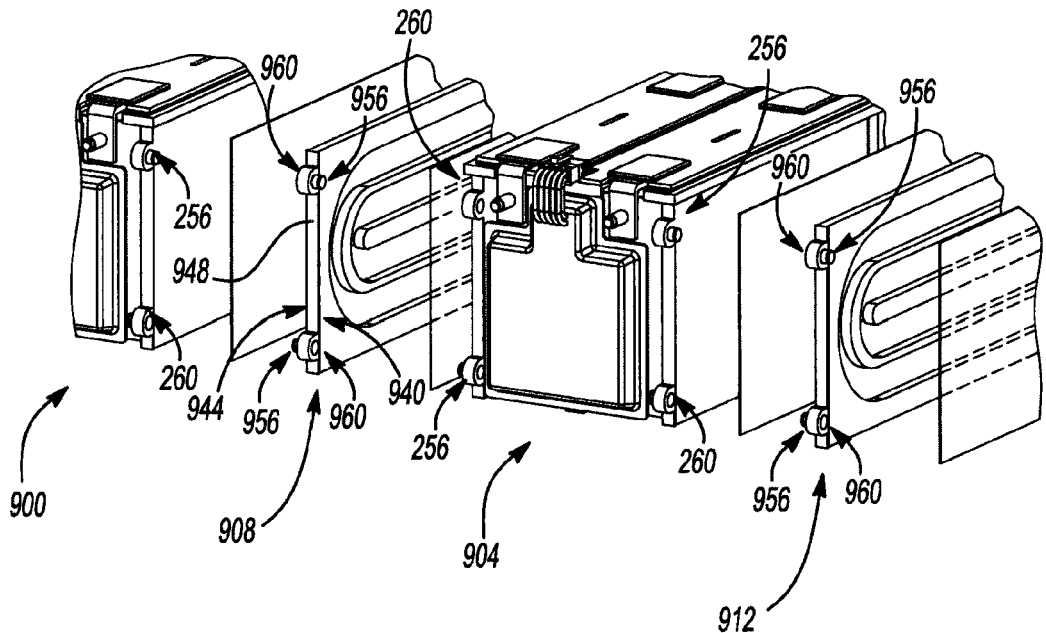
FIG. 23 includes a perspective view of a plurality of example battery modules and a plurality of external liquid cooling members.

For a battery module that includes a liquid cooling assembly inserted within its cooling chamber, additional external liquid cooling members may be applied to the exterior surfaces of the side walls of the modular frame 200 to cool two faces of each cell of the battery module. For example, FIG. 23 includes a perspective view of first and second battery modules 900 and 904 and first and second exterior liquid cooling members 908 and 912. In the example of FIG. 23, the first and second exterior liquid cooling members 908 and 912 are shown in exploded views.

Figure 24:
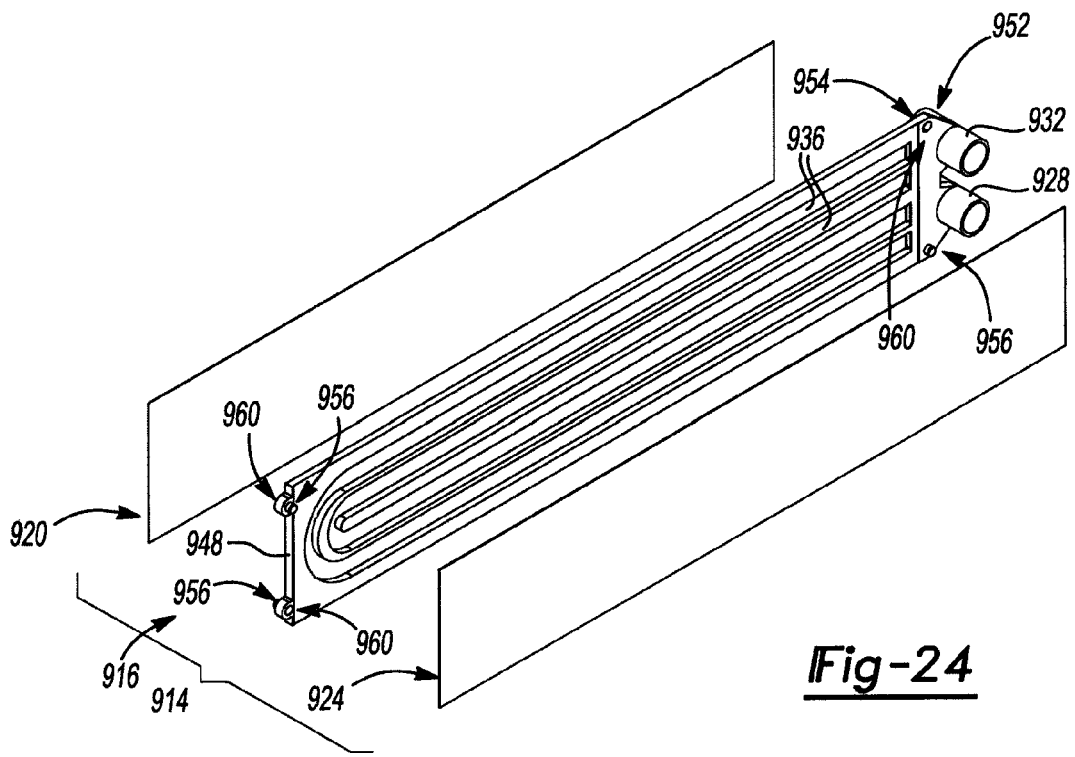
FIG. 24 includes an exploded view of an example external liquid cooling member.

Referring now to FIG. 24, an example exploded view of an external liquid cooling member 914 is presented. The external liquid cooling members 908 and 912 and other external liquid cooling members used may be similar or identical to the external liquid cooling member 914.

The external liquid cooling member 914 includes a body assembly 916 and first and second flexible skins 920 and 924. The body assembly 916 may be formed from the same plastic material as the modular frame 200 or another suitable material that is chemically resistant to the coolant. The external liquid cooling members 914 may be formed, for example, using injection molding or another suitable process. The first and second flexible skins 920 and 924 may be formed from the same plastic material as the modular frame 200 or another suitable material that is chemically resistant to the coolant.

The body assembly 916 includes a coolant inlet 928 and a coolant outlet 932. The body assembly 916 also includes one or more apertures 936. The first and second flexible skins 920 and 924 are joined to the body assembly 916. Once joined with the body assembly 916, the apertures 936 and the flexible skins 920 and 924 together form one or more coolant channels.

The coolant inlet 928 distributes coolant input to the coolant inlet 928 to the coolant channel(s). The coolant flows through the coolant channels from the coolant inlet 928 to the coolant outlet 932. The coolant is output from the external liquid cooling member 914 via the coolant outlet 932.

Referring now to FIGS. 23 and 24, the external liquid cooling member 914 also includes a first side 940 and a second side 944. The external liquid cooling member 914 also includes a first end 948 and a second end 952. The external liquid cooling member 914 includes one or more male connecting members 956 and one or more female connecting members 960 formed at each of the first and second ends 948 and 952.

Figure 25:
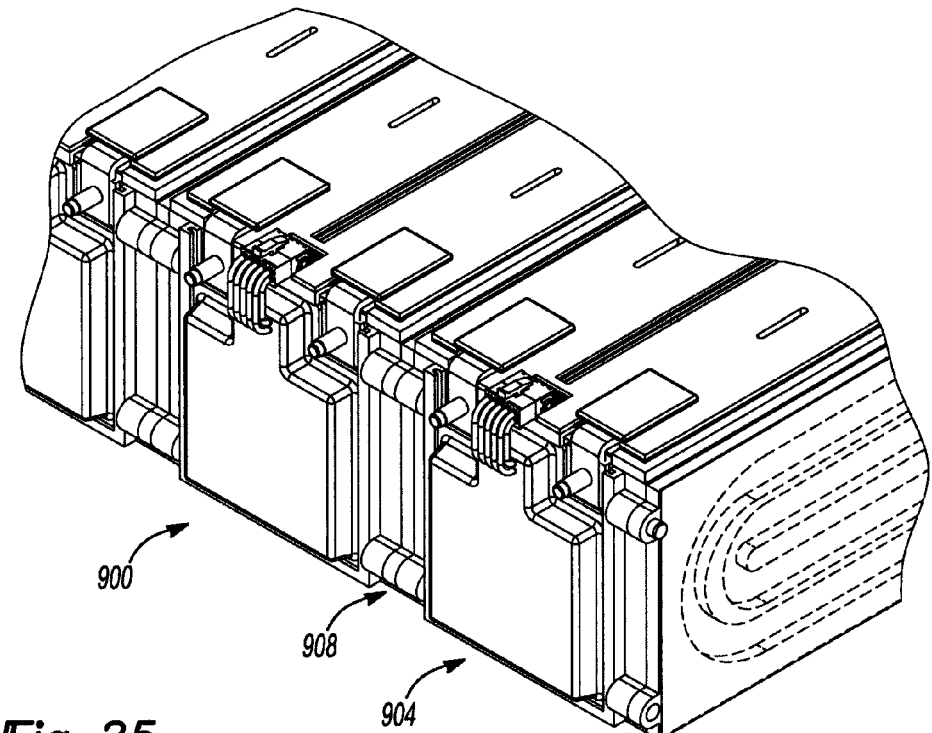
FIGS. 25-26 include perspective views of a plurality of example battery modules connected with external liquid cooling members.

The arrangement of the male and female connecting members 956 and 960 of the first and second ends 948 and 952 of the external liquid cooling member 914 is the same as the arrangement of the male and female connecting members 256 and 260 formed on the first and second end walls 204 and 208 of the modular frame 200. The male and female connecting members 956 and 960 therefore can be mated with the female and male connecting members 260 and 256 of the modular frame 200 and one or more other components having the same arrangement of connecting members. FIG. 25 includes an example perspective view of the battery modules 900 and 904 connected with the external liquid cooling members 908 and 912 via their connecting members.

Figure 26:
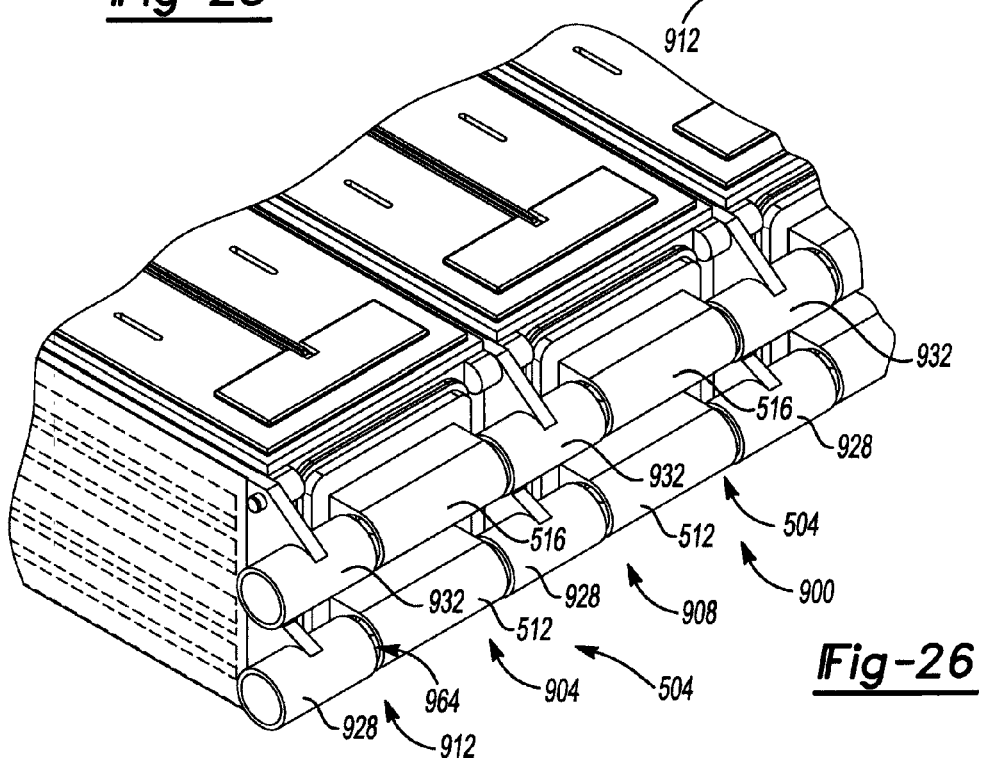

FIG. 26 includes another perspective view of the battery modules 900 and 904 connected with the external liquid cooling members 908 and 912 via their connecting members. As shown in the example of FIG. 26, the first battery module 900 includes a liquid cooling member like the liquid cooling member 504. The second battery module 904 also includes a liquid cooling member like the liquid cooling member 504.

When the male and female connectors 956 and 960 are mating with the female and male connecting members 260 and 256 of an external liquid cooling member, the coolant inlet 928 connects with the coolant inlets of the liquid cooling members of the battery modules that are adjacent to the external liquid cooling member. For example only, the cooling inlet 928 of the first external liquid cooling member 908 connects with the coolant inlet 512 of the first battery module 900 and the coolant inlet 512 of the second battery module 904. The same is true for the coolant outlet 932 connecting with the coolant outlets of the liquid cooling members of the battery modules that are adjacent to the external liquid cooling member. A coolant inlet/outlet of an external liquid cooling member and a coolant inlet/outlet of a liquid coolant assembly of a battery module may connect, for example, via a coupler, such as coupler 964.

When an element, component or layer is referred to herein as being "on," "engaged to," "connected to," or "coupled to" another element, component or layer, it may be directly on, engaged, connected or coupled to the other element, component or layer, or intervening elements, components or layers may be present. In contrast, when an element is referred to as being "directly on," "directly engaged to," "directly connected to," or "directly coupled to" another element, component or layer, there may be no intervening elements, components or layers present. Other words used to describe the relationship between elements, components or layers should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, portions, layers and/or sections, these elements, components, portions, layers and/or sections should not be limited by these terms. These terms may be only used to distinguish one element, component, portion, layer or section from another element, component, portion, layer or section. Terms such as "first," "second," and other numerical terms when used herein do not imply a sequence or order unless clearly indicated by the context. Thus, a first element, component, portion, layer or section discussed below could be termed a second element, component, portion, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Generally, as used to describe relationships between elements, may mean within five degrees of the stated term. For example, generally perpendicular may mean within five degrees of perpendicularity, generally parallel may mean within 4 degrees of parallel, and so on. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A modular frame for a battery module, the modular frame comprising:
   a floor;
   end walls that are perpendicular to the floor;
   side walls that are perpendicular to the floor and that are perpendicular to the end walls;
   substantially solid interior walls that extend between the end walls, that are perpendicular to the floor, and that are perpendicular to the end walls;
   a first space within the modular frame that is defined by the floor, the end walls, a first one of the side walls, and a first one of the interior walls and that is adapted to receive N prismatic cells of the battery module, wherein N is an integer greater than zero;
   a second space within the modular frame that is defined by the floor, the end walls, a second one of the side walls, and a second one of the interior walls and that is adapted to receive N other prismatic cells of the battery module, wherein the first and second ones of the side walls are different, and wherein the first and second ones of the interior walls are different;
   a chamber that is disposed between the interior walls;
   a first aperture to the chamber, wherein the first aperture is defined at least in part by the interior walls and the end walls; and
   a second aperture to the chamber, wherein the second aperture is formed through one of the end walls.

2. The modular frame of claim 1 further comprising a third aperture to the chamber, wherein the third aperture is formed through the floor.

3. A battery module comprising:
   the modular frame of claim 2; and
   a cooling member that is inserted into the chamber through the first aperture and that includes channels formed in the cooling member, wherein the channels provide flow paths between the first aperture and the third aperture.

4. The battery module of claim 3 wherein the modular frame and the cooling member include polypropylene (PPE).

5. The battery module of claim 3 further comprising:
   the N prismatic cells disposed within the first space within the modular frame; and
   the N other prismatic cells disposed within the second space within the modular frame.

6. A battery module comprising:
   the modular frame of claim 2; and
   a cooling member that includes a body portion that is inserted into the chamber through the second aperture, that includes a coolant inlet, that includes a coolant outlet, and that includes a coolant channel formed within the body portion for directing a liquid coolant from the coolant inlet to the coolant outlet.

7. The battery module of claim 6 further comprising:
   a first cap that is joined with the modular frame and that seals the first aperture; and
   a second cap that is joined with the modular frame and that seals the third aperture.

8. The battery module of claim 7 wherein the modular frame, the cooling member, and the first and second end caps include polypropylene (PPE).

9. The battery module of claim 6 further comprising:
   the N prismatic cells disposed within the first space within the modular frame; and
   the N other prismatic cells disposed within the second space within the modular frame.

10. The battery module of claim 6 wherein:
    the modular frame further comprises a raised member that is raised relative to an exterior surface of the one of the end walls, that is formed on the exterior surface of the one of the end walls, and that encircles the second aperture; and
    the cooling member further comprises a face plate, wherein the cooling member is joined with the modular frame at the face plate and the raised member.

11. A battery module comprising:
    the modular frame of claim 1;
    a raised member that is raised relative to an exterior surface of a second one of the end walls and that is formed on the exterior surface of the second one of the end walls, wherein the one of the end walls and the second one of the end walls are different; and a controller that includes a grooved member that is formed on an exterior surface of the controller, wherein the grooved member is recessed relative to the exterior surface of the controller, and the grooved member is adapted to receive the raised member.

12. The modular frame of claim 1 further comprising:
    M slot walls that each extend between the first one of the side walls and the first one of the interior walls, that are perpendicular to the floor, that are perpendicular to the interior walls, that are perpendicular to the side walls, and that divide the first space into N slots for the N prismatic cells; and
    M other slot walls that each extend between the second one of the side walls and the second one of the interior walls, that are perpendicular to the floor, that are perpendicular to the interior walls, that are perpendicular to the side walls, and that divide the second space into N other slots for the N other prismatic cells, wherein M is equal to N minus one.

13. A battery module comprising:
    the modular frame of claim 12;
    the N prismatic cells disposed within the N slots; and
    the N other prismatic cells disposed within the N other slots.

14. The battery module of claim 13 wherein the modular frame is formed from an electrically non-conductive material.

15. The battery module of claim 14 wherein the N prismatic cells and the N other prismatic cells each include a positive terminal, a negative terminal, and an electrically conductive housing that is connected to the positive terminal.

16. The battery module of claim 14 further comprising an interconnection assembly that rests upon top surfaces of the end walls, the side walls, the interior walls, the M slot walls, and the M other slot walls, that includes the electrically non-conductive material, and that includes:
    Q apertures formed through the interconnection assembly; and
    Q terminal connectors disposed within the Q apertures, respectively, wherein terminals of the N prismatic cells and the N other prismatic cells extend into the Q apertures, and wherein Q is an integer and is less than or equal to N.

17. A modular frame for a battery module, the modular frame comprising:
- a floor that includes an electrically non-conductive material;
- end walls that are perpendicular to the floor and that include the electrically non-conductive material;
- side walls that are perpendicular to the floor, that are perpendicular to the end walls, and that include the electrically non-conductive material; and
- substantially solid interior walls that include the electrically non-conductive material and that define:
- a first row of cell slots configured to receive a first plurality of prismatic cells of the battery module;
- a second row of cell slots configured to receive a second plurality of prismatic cells of the battery module;
- a chamber disposed between the first and second rows of cell slots;
- a first aperture to the chamber, wherein the first aperture is defined by the interior walls and the end walls; and
- a second aperture to the chamber, wherein the second aperture is formed through one of the end walls.

18. The modular frame of claim 17 further comprising a raised member that is raised relative to an exterior surface of the one of the end walls, that is formed on the exterior surface of the one of the end walls, and that encircles the second aperture.

19. The modular frame of claim 17 further comprising a raised member that is raised relative to an exterior surface of a second one of the end walls and that is formed on the exterior surface of the second one of the end walls, wherein the one of the end walls and the second one of the end walls are different.

20. The modular frame of claim 17 further comprising:
- a first raised member that is raised relative to an exterior surface of the one of the end walls, that is formed on the exterior surface of the one of the end walls, and that encircles the second aperture; and
- a second raised member that is raised relative to an exterior surface of a second one of the end walls and that is formed on the exterior surface of the second one of the end walls, wherein the one of the end walls and the second one of the end walls are different.

* * * * *